3,342,858
PREPARATION OF ALKOXY-ALKANOIC ACIDS BY THE OXIDATION OF ALKOXY-ALKANOLS
Robert Fuhrmann, Morris Plains, Emery C. Lazar, Morristown, and Jan F. Van Peppen, Chester, N.J., assignors to Allied Chemical Corporation, New York, N.Y., a corporation of New York
No Drawing. Filed Aug. 20, 1964, Ser. No. 391,008
4 Claims. (Cl. 260—531)

ABSTRACT OF THE DISCLOSURE

This invention relates to the preparation of alkoxyalkanoic acids by the oxidation of the corresponding alkoxyalkanols in the presence of catalytic platinum, the pH of the reaction medium being adjusted to a value greater than 7 before completion of the oxidation.

It is difficult to oxidize alkoxyalkanols without splitting the molecular chain at the ether linkage thereby producing a large proportion of undesired by-product. Heretofore, alkoxyalkanols such as methyl carbitol have been successfully converted to the corresponding carboxylic acids by oxidizing them with nitric acid. However, this process requires the use of a large excess of nitric acid which must be subsequently separated from the reaction product. The bulk of the nitric acid can be removed by distillation with the preferred procedure being vacuum distillation in a falling film evaporator. However, not all of the nitric acid can be separated by distillation, and the reaction product thus obtained contains about 1–2% of nitric acid as a highly corrosive and undesirable adulterant. In United States Patent No. 2,659,754, issued Nov. 17, 1953, there is disclosed a procedure for eliminating this contaminant in which $SO_2$ is added to form a complex with the nitric acid following which the complex is separated by vacuum distillation. These extra purification steps are, of course, expensive and time consuming, and it is highly desirable to eliminate their necessity.

It is, therefore, an object of this invention to oxidize alkoxyalkanols to form alkoxyalkanoic acids in high yields by a process which does not require the presence of nitric acid.

A further object of this invention is to provide a process for the preparation of alkoxyalkanoic acids in which highly corrosive, difficult to separate, side-products are not formed.

Additional objects and advantages of this invention will be apparent from the following detailed description thereof.

In accordance with the present invention, we have discovered that alkoxyalkanols of the formula:

wherein R is an alkyl group, preferably of 1 to 20 carbon atoms, R' is an alkyl group, preferably of 1 to 5 carbon atoms, and n is an integer of from 1–5, can be converted to the corresponding alkoxyalkanoic acids of the formula:

by oxidation in the presence of a platinum catalyst. The groups R and R' can be substituted with any substituent which does not interfere with the oxidation of the hydroxy group. Such substituents include —COOH, —$CONH_2$ and COOR", wherein R" is an alkyl or aryl group.

The reaction should be carried out in a solvent medium. The preferred solvent for the reaction is water, but mixtures of water with dioxane or acetone can also be used, although the reaction is somewhat slower. When water is used as a solvent, the concentration of the alcohol in the solution is preferably about 3–12% by weight.

The platinum catalyst is preferably either platinum on a support such as carbon, alumina, clay, silica, $TiO_2$, etc., or a platinum oxide which is reduced with hydrogen before use. Typical supported catalysts for use in the present invention contain about 5–15% platinum on the surface of the support. Catalysts having a carbon or alumina support can be prepared by the reduction of platinum on the surface of the carrier by formalin in a sodium carbonate medium. A method of preparing catalysts having clay or silica supports comprises applying the platinum by impregnating the carrier with a solution of chloroplatinic acid in an ammoniacal medium at 60°–70° C., recovering the catalyst by filtration, washing and drying the catalyst and reducing the platinum in a stream of hydrogen at about 340°–360° C. Satisfactory catalysts containing about 10% platinum on carbon are presently commercially available.

The reaction can be conducted under relatively mild conditions, with good results being obtained using a temperature of about 20°–75° C. and a gas pressure of less than about 3 atmospheres. A preferred pressure range is about 0.5 to 1.2 atmospheres. If desired, greater gas pressure and higher temperatures can be used to increase the rate of reaction, but when using high temperatures, care must be taken not to form an excessive amount of by-products. When temperatures much over 75° C. are used, the gas pressure should be greater than 1 atmosphere.

The oxygen can be introduced by any gas-containing molecular oxygen such as oxygen, oxygen in a mixture with an inert gas such as nitrogen, air, etc. Operating the reaction at an oxygen consumption much higher than the stoichiometric amount required results in side reactions such as chain scission at the ether linkage. In general, to minimize these side reactions, the oxygen consumption should not be greater than about 1.3 moles of oxygen per mole of alcohol.

If the reaction is conducted in an acid or neutral medium, the oxidation of the alcohol will substantially stop at the aldehyde stage with only very slow conversion to acid. In order to obtain the desired acids, the reaction medium must be basic at the completion of the reaction. Thus a base is added to the reaction mixture either at the beginning of the reaction or after partial completion of the reaction to adjust the pH to a value greater than 7, preferably about 8–12. The base may be an alkali metal hydroxide or carbonate; for example, sodium hydroxide, potassium hydroxide, sodium carbonate, sodium bicarbonate, which can be added either in solid form or in an aqueous solution and preferably is added before about one-half of the oxygen to be reacted has been reacted. A large excess of base is unnecessary and causes darkening of the reaction mass. The acid product is produced in the form of its alkali metal salt and it is to be understood that the term "acid" as used in the appended claims is intended to include the salt forms as well as the free acid form.

The reaction product can be purified by a number of conventional procedures. One method is acidifying the reaction product with a strong inorganic acid such as HCl to convert the product to its acid form, adding a salt such as sodium sulfate to increase the number of ions in the water and thus increasing the selective solubility of the product in ether and then extracting the alkoxyalkanoic acid with ether. Next, the ether is evaporated and the acid product is dried, as by drying with a salt such as sodium sulfate or by azeotropic distillation with benzene, etc. Further purification can be effected by fractional distillation.

The yields of alkoxyalkanoic acid obtained by this invention are excellent with from about 50–90% of starting material being converted. The acid products are of a high purity of about 95% or more. These alkoxyalkanoic acids can be converted to outstanding surfactants by esterification with a straight chain alcohol such as lauryl alcohol.

The following examples are given to further illustrate the invention, but it is to be understood that the invention is not to be limited in any way by the details described therein. In all of the examples, the gas pressure during oxidation was about 1 atmosphere.

*Example 1.—(Oxidation of* $CH_3OCH_2CH_2OCH_2CH_2OH$)

15.15 grams of $PtO_2$ were suspended in water and reduced with hydrogen in a Parr apparatus. The platinum suspension was transferred to a 5-liter wide-mouth flask equipped with a stirrer, thermometer, and gas inlet and outlet tubes. 120 grams of "methyl carbitol" and 39 grams of sodium hydroxide were added, and the solution was diluted with water to a total volume of 1500 ml. Oxygen was introduced for several hours through a gas meter until 1050 millimoles of oxygen were taken up. During the oxidation the temperature increased from room temperature to a maximum of 35° C.

The catalyst was removed by filtration and the pH of the aqueous solution was brought to 2.0 with concentrated hydrochloric acid. The solution was then extracted with ether for several hours in a continuous extractor. When 92% of the acid had been extracted, the ether was evaporated and the methoxyethoxyacetic acid fractionated at ca. 83° C./0.6 mm. 69% of the theoretical yield was obtained.

*Example 2.—(Oxidation of* $CH_3CH_2OCH_2CH_2OH$)

150 grams of 10% platinum catalyst on carbon, 180 grams of cellosolve (ethyleneglycol ethyl ether), 88 grams of sodium hydroxide pellets, and water to make up a total volume of 3000 ml. (a 6% concentration of alcohol) were added to a reactor as in Example 1. Oxygen was passed through a meter until 2510 millimoles had been taken up, which took about 4 hours. During the oxidation, the temperature increased to a maximum of 65° C. The reaction was stopped, the catalyst removed by filtration, and the solution concentrated by flash distillation to about 400 ml. The solution was acidified to pH 1.0 with concentrated hydrochloric acid. 45 grams of sodium sulfate were added and shaken with the solution to saturation, and the solution decanted from the remaining solid. The amount of acid produced was determined by titration, and a continuous ether extraction carried out as in Example 1 for 7 hours, when 98.4% of the acid had been extracted. The aqueous layer was separated and the ether portions combined. 80 grams of sodium sulfate were added to dry the ether solution. The sodium sulfate was filtered and washed with additional ether. The ether was distilled and the product fractionated by vacuum distillation. 180 grams (an 89% yield) of pure ethoxyacetic acid were obtained by distilling at 46° C./0.3 mm.

*Example 3.—(Oxidation of* $CH_3CH_2OCH_2CH_2OH$)

360 grams of cellosolve, 150 grams of 10% platinum on carbon, 4.7 equivalents of sodium carbonate and sufficient water to make up a volume of 3000 ml. (or a 12% concentration of alcohol) were admixed and the cellosolve oxidized in a reactor similar to that of Example 1 by passing oxygen through the system for 24 hours. During the reaction the temperature increased from room temperature to about 43° C.

After filtering out the catalyst, the solution was concentrated by flash distillation, and acidified to pH 1.0 with concentrated hydrochloric acid. 80 grams of sodium sulfate were added, and the solution decanted. The aqueous solution was extracted continuously with ether for about 48 hours until about 97% of the acid product was extracted. The water was removed by azeotropic distillation with benzene and the ether distilled off. The product was fractionally distilled, and 283 grams of ethoxyacetic acid (a 68% yield) were obtained, distilling at 67° C./0.5 mm.

We claim:

1. A process of preparing an alkoxyalkanoic acid of the formula $$R(OR')_nOCH_2COOH$$

wherein R is an alkyl group of 1 to 20 carbon atoms, R' is an alkyl group of 1 to 5 carbon atoms, and $n$ is an integer of from 1 to 5 by oxidizing the corresponding alkoxyalkanol, said process comprising intimately contacting said alkoxyalkanol in liquid phase at a temperature of about 20 to 75° C. with a gas containing molecular oxygen in the presence of a catalytically effective amount of platinum, the pH of the reaction medium being adjusted to a value greater than 7 by the addition of a base before more than one half of the oxidation is completed.

2. A process as claimed in claim 1 wherein an initiation of the oxidation said alkoxyalkanol is present in a 3–12% by weight solution in water.

3. A process as claimed in claim 1 wherein said gas containing molecular oxygen is brought in contact with said alkoxyalkanol at a maximum pressure of about 3 atmospheres.

4. A process as claimed in claim 1 wherein the pH greater than 7 is obtained by means of an alkali metal compound selected from the group consisting of hydroxides and carbonates.

References Cited

UNITED STATES PATENTS 2,653,972  9/1953  Ash et al. _____ 260—531
2,921,090  1/1960  Parker et al. _____ 260—530

RICHARD K. JACKSON, *Primary Examiner.*

V. GARNER, *Assistant Examiner.*